(12) United States Patent
Yamada et al.

(10) Patent No.: US 11,424,444 B2
(45) Date of Patent: Aug. 23, 2022

(54) LITHIUM ION SECONDARY BATTERY

(71) Applicant: TOYOTA JIDOSHA KABUSHIKI KAISHA, Toyota (JP)

(72) Inventors: Takanobu Yamada, Toyota (JP); Masaki Kato, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 161 days.

(21) Appl. No.: 16/742,099

(22) Filed: Jan. 14, 2020

(65) Prior Publication Data
US 2020/0227737 A1 Jul. 16, 2020

(30) Foreign Application Priority Data

Jan. 15, 2019 (JP) .............................. JP2019-004661

(51) Int. Cl.
| | |
|---|---|
| *H01M 4/36* | (2006.01) |
| *H01M 4/136* | (2010.01) |
| *H01M 4/58* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/366* (2013.01); *H01M 4/136* (2013.01); *H01M 4/5825* (2013.01); *H01M 4/628* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 6,335,114 B1 | 1/2002 | Ueshima et al. | |
| 2004/0202928 A1 | 10/2004 | Miyamoto et al. | |
| 2012/0058375 A1 | 3/2012 | Tanaka et al. | |
| 2015/0243964 A1* | 8/2015 | Yu ..................... | H01M 10/0567 |
| | | | 429/233 |
| 2015/0311563 A1 | 10/2015 | Abe et al. | |
| 2016/0043373 A1 | 2/2016 | Arishima et al. | |
| 2017/0104246 A1 | 4/2017 | Takeda | |
| 2021/0194007 A1* | 6/2021 | Danno ................ | H01G 11/24 |

FOREIGN PATENT DOCUMENTS

| | | |
|---|---|---|
| JM | 2018-98141 A | 6/2018 |
| JP | 2001-93583 A | 4/2001 |
| JP | 2004-259625 A | 9/2004 |

(Continued)

*Primary Examiner* — Wyatt P McConnell
(74) *Attorney, Agent, or Firm* — Sughrue Mion, PLLC (57) ABSTRACT

A lithium ion secondary battery suppressed in heat generation entailed by charging and discharging is provided. A lithium ion secondary battery includes a positive electrode and a negative electrode. The positive electrode includes a positive electrode collector, a positive electrode active material layer provided at some part of the surface of the positive electrode collector, and including a positive electrode active material, and an insulation layer provided so as to be at the other part of the surface of the positive electrode collector and to be adjacent to the positive electrode active material layer. The insulation layer includes an inorganic filler, LPO, and a binder.

5 Claims, 4 Drawing Sheets

(56) References Cited

FOREIGN PATENT DOCUMENTS

| | | |
|---|---|---|
| JP | 2012-74359 A | 4/2012 |
| JP | 2015-103332 A | 6/2015 |
| JP | 2017-76484 A | 4/2017 |
| JP | 2017-143004 A | 8/2017 |
| KR | 10-2014-0132618 A | 11/2014 |
| KR | 10-2015-0123168 A | 11/2015 |
| WO | 2014/162437 A1 | 10/2014 |
| WO | 2015/075521 A1 | 5/2015 |

* cited by examiner

LITHIUM ION SECONDARY BATTERY

CROSS-REFERENCE TO RELATED APPLICATIONS

The present application claims the priority based on Japanese Patent Application No. 2019-004661 filed on Jan. 15, 2019, the entire contents of which are incorporated herein by reference.

BACKGROUND

The present disclosure relates to a lithium ion secondary battery.

A lithium ion secondary battery is lightweight, and can achieve a high energy density, and hence has been preferably used as a potable power supply or a high-output power supply to be mounted in a vehicle. The lithium ion secondary battery has a lamination structure in which a plurality of capacitive elements each configured such that a positive electrode and a negative electrode are insulated from each other by a separator or the like are stacked in one battery case. Thereby, the lithium ion battery is configured to enable production of high electric power from large-area positive electrode and negative electrode by one charging and discharging.

However, a secondary battery for the purpose of performing charging and discharging at a high output and a high rate is characterized in that the battery tends to generate heat even for normal use (charging and discharging). Especially, of the positive electrode collector, a collecting part is the uncoated part not including a positive electrode active material layer, and therefore has a high current density and tends to be rendered in a highly oxidized state, and tends to generate heat. The heat generation of a lithium ion secondary battery is a problem to be improved for enhancing the safety in battery use.

The present disclosure was completed in view of such circumstances. It is an object thereof to provide a lithium ion secondary battery suppressed in heat generation arising from charging and discharging.

SUMMARY

As the one for solving the foregoing problem, the technology herein disclosed provides a lithium ion secondary battery including a positive electrode and a negative electrode. In the lithium ion secondary battery, the positive electrode includes a positive electrode collector, a positive electrode active material layer including a positive electrode active material provided at some part of the surface of the positive electrode collector, and an insulation layer provided so as to be at the other part of the surface of the positive electrode collector and to be adjacent to the positive electrode active material layer. Then, the insulation layer includes an inorganic filler, trilithium phosphate, and a binder.

Trilithium phosphate ($Li_3PO_4$; which may be hereinafter simply referred to as "LPO") is dissolved in the form of phosphoric acid ions ($PO_4^{3-}$) involving an acid-base reaction with the acid generated due to the oxidative decomposition of the electrolyte when the positive electrode potential becomes higher due to the overcharge of the secondary battery, or the like. The phosphoric acid ions have a function of reaching the negative electrode and forming a film for suppressing the exothermic reaction of the negative electrode, and thereby improving the overcharge resistance of the battery. A study by the present inventors revealed the following: an insulation layer is provided, and LPO is disposed at the positive electrode coated end which tends to be in a high potential state due to the current concentration; as a result, the film formed at the negative electrode deriving from the LPO can effectively suppress the exothermic reaction of the negative electrode. Further, it has been found that the overcharge resistance can be effectively enhanced. Note that the configuration in which an insulation layer is provided at the positive electrode coated end is known (see, for example, Japanese Patent Application Publication No. 2017-143004). However, the fact that the disposition of LPO at the insulation layer is particularly effective for the overcharge resistance is the previously unknown matter. The present technology has been completed based on such findings.

In some embodiments of the lithium ion secondary battery herein disclosed, the positive electrode active material layer includes LPO, and P1/P2≥1 is satisfied, where P1 represents the proportion of the LPO occupying the insulation layer, and P2 represents the proportion of the trilithium phosphate occupying the positive electrode active material layer.

For example, Japanese Patent Application Publication No. 2015-103332 includes the disclosure to the effect that inclusion of LPO in the positive electrode active material layer at a prescribed ratio can improve the output characteristic and the durability of the battery. Herein, with the configuration in which LPO is included in the whole positive electrode active material layer at a prescribed ratio, the required amount of LPO was large, and the cost swelled. However, as described above, the disposition of LPO at the insulation layer can intensively suppress the heat generation at the easily heat generating portion of the negative electrode. As a result, for example, with the configuration in which the positive electrode active material layer includes LPO, it is possible to reduce the amount of LPO to be added to the positive electrode active material layer. This can provide a battery suppressed in heat generation at a reduced cost.

In some embodiments of the lithium ion secondary battery herein disclosed, S1/S2 is 1 or more, where S1 represents the specific surface area of the LPO included in the insulation layer, and S2 represents the proportion of the LPO included in the positive electrode active material layer. Such a configuration can promote the dissolution of LPO included in the insulation layer, and the formation of a film at the surface of the negative electrode. As a result, the heat generation of the battery can be effectively suppressed by a smaller amount of LPO.

In some embodiments of the lithium ion secondary battery herein disclosed, D1<D2<D3 is satisfied, where D1 represents the average particle diameter of the inorganic filler included in the insulation layer, D2 represents the average particle diameter of the trilithium phosphate included in the insulation layer, and D3 represents the average particle diameter of the positive electrode active material included in the positive electrode active material layer. Also with such a configuration, the effect can be better exerted. Further, it is possible to reduce the thickness of the insulation layer.

In some embodiments of the lithium ion secondary battery herein disclosed, T1/T2≤1 is satisfied, where T1 represents the average thickness of the insulation layer, and T2 represents the average thickness of the positive electrode active material layer. At the collecting part for receiving power from a plurality of capacitive elements, the insulation layer may inhibit collecting of foil of the collector (uncoated part) and may entail insufficient welding. Therefore, such a configuration can reduce the volume of the insulation layer, and terminal welding can be avoiding from being insufficient.

The lithium ion secondary battery described up to this point can be provided as the one suppressed in heat generation, and also having high safety. By taking advantage of such features, it is possible to suppress the temperature rise of, for example, a battery having a lamination structure (including a wound body) including a plurality of capacitive elements stacked therein, or a battery for the purpose of repeatedly charging and discharging large current at a high rate. Therefore, in some embodiments, the lithium ion secondary battery herein disclosed can be used as a main power supply (driving power supply) for, for example, a hybrid vehicle or a plug-in hybrid vehicle of vehicles, or the like.

DESCRIPTION OF THE EMBODIMENTS

One embodiment of the lithium ion secondary battery herein disclosed will be described below. Note that matters necessary for executing the present disclosure, except for matters (e.g., a configuration of an insulation layer) specifically referred to herein (e.g., a structure of a secondary battery or a manufacturing process not featuring the present disclosure) can be grasped as design matters of those skilled in the art based on the related art in the present field. The present disclosure can be executed based on the contents disclosed herein, and the technical common sense in the present field. Further, the dimensional relation (such as length, width, or thickness) in each drawing shown below does not necessarily reflect the actual dimensional relation. Then, the expression "X to Y" indicating the numerical value range herein means "X or more and Y or less".

Further, the term "lithium ion secondary battery" herein represents a battery in general capable of repeatedly performing charging and discharging due to the movement of electric charges between positive and negative electrodes in association with lithium ions using lithium ions as an electrolyte. The electrolyte in the lithium ion secondary battery may be, for example, any of gel electrolyte, solid electrolyte, and electrolytic solution. Such lithium ion secondary batteries include, other than batteries generally referred to as a lithium ion battery, a lithium secondary battery, and the like, a lithium polymer battery, a lithium ion capacitor, and the like. Especially, the present technology can perfectly exert the effect, especially when applied to a nonaqueous electrolytic solution secondary battery which tends to generate heat due to decomposition of the electrolytic solution during overcharging. The technology herein disclosed will be described below by taking the case where the lithium ion secondary battery is a nonaqueous electrolytic solution secondary battery as an example.

Lithium Ion Secondary Battery

Figure 1:
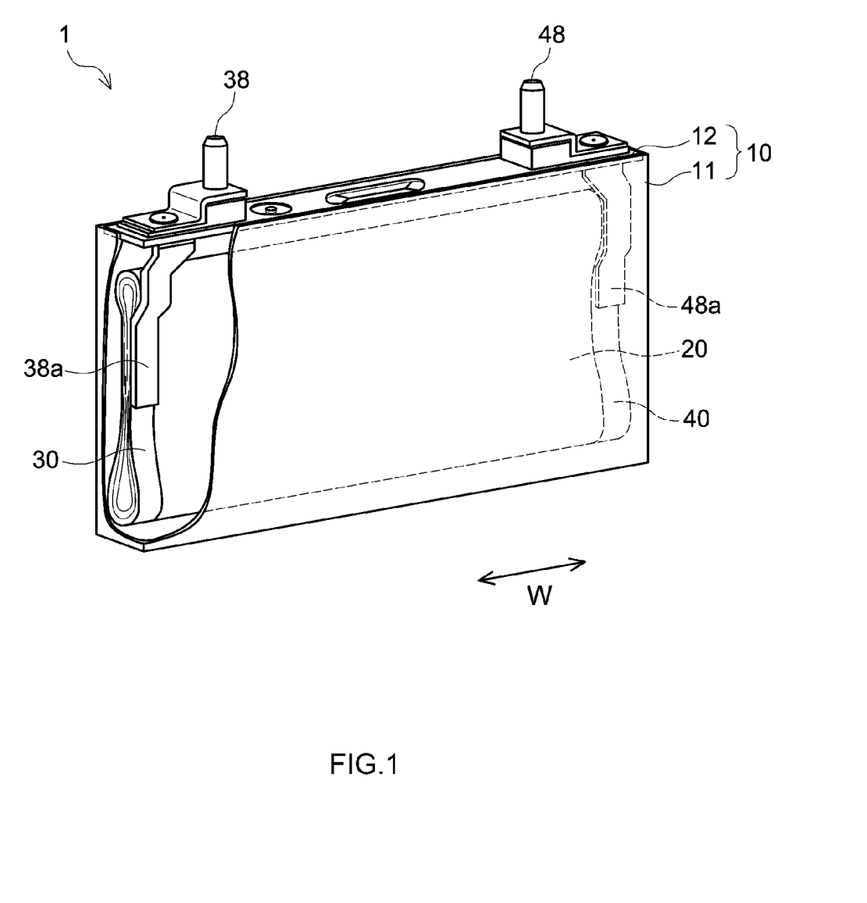
FIG. 1 is a cutaway perspective view schematically showing a configuration of a lithium ion secondary battery in accordance with one embodiment.
Figure 2:
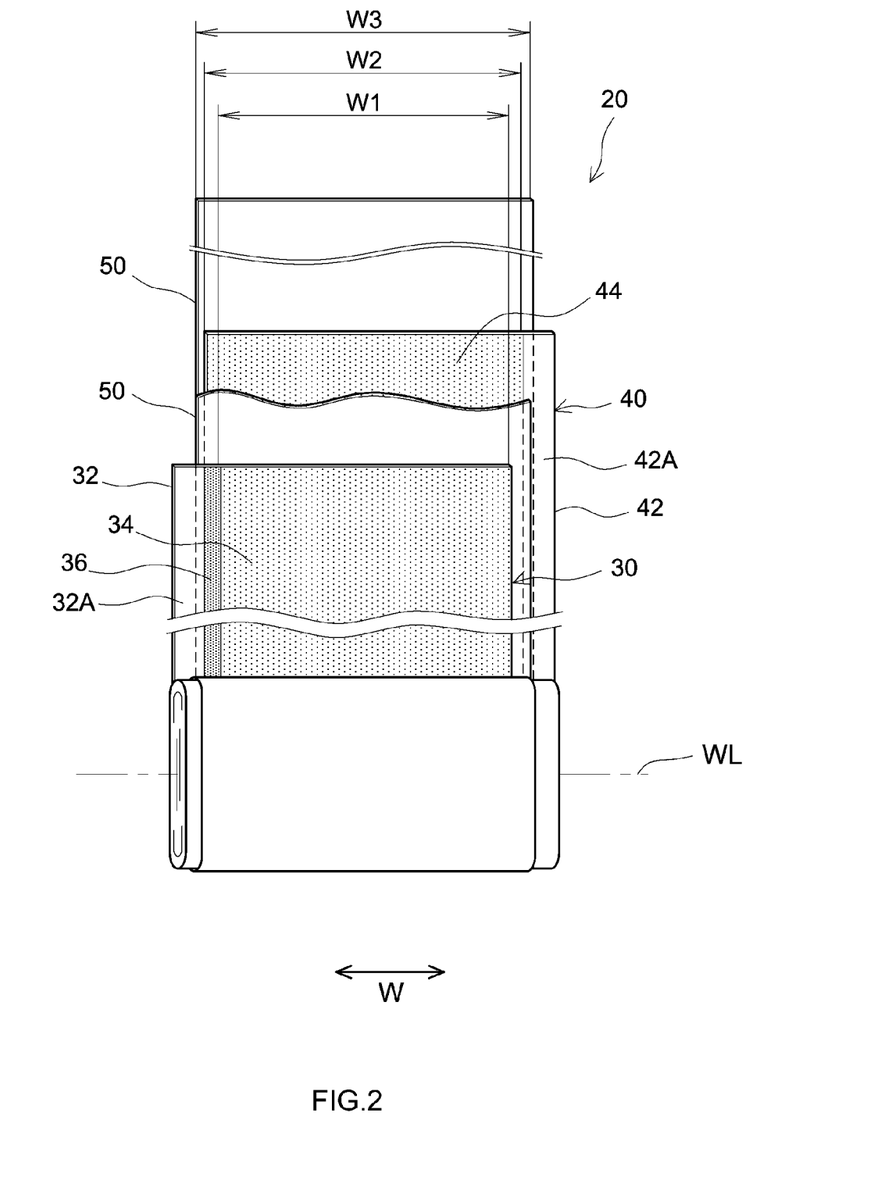
FIG. 2 is a developed perspective view for illustrating a configuration of a wound electrode body.

FIG. 1 is a cutaway perspective view showing a configuration of a lithium ion secondary battery 1 herein disclosed. The lithium ion secondary battery 1 is configured such that a wound type electrode body 20 including a positive electrode 30 and a negative electrode 40 is accommodated with a nonaqueous electrolytic solution (not shown) in a battery case 10. W in the drawing represents the width direction of the battery case 10 and the wound type electrode body 20 and agrees with the wound axis WL of the wound type electrode body 20 shown in FIG. 2. As shown in FIG. 2, the wound type electrode body 20 includes the positive electrode 30 and the negative electrode 40, and two separators 50.

The positive electrode 30 includes a positive electrode collector 32, a positive electrode active material layer 34, and an insulation layer 36.

The positive electrode active material layer 34 is a porous body including a positive electrode active material and can be impregnated with an electrolytic solution. The positive electrode active material releases or occludes lithium ions of electric charge carriers from the electrolytic solution or to the electrolytic solution, respectively. The positive electrode active material layer 34 can additionally include a conductive material or LPO. The positive electrode active material layer 34 is provided at some part of the surface (one side or both sides) of the positive electrode collector 32. The positive electrode collector 32 is a member for holding the positive electrode active material layer 34 and recovering electric charges from the positive electrode active material layer 34 along with release of lithium ions by the positive electrode active material layer 34. In some embodiments, the positive electrode collector 32 is formed of a conductive member including a metal (e.g., aluminum, nickel, titanium, or stainless steel) electrochemically stable in the positive electrode environment in the battery and having good electric conductivity.

For the positive electrode active material layer 34, typically, particulate positive electrode materials are bonded to each other with a conductive material by a binder (binding agent) and are joined to the positive electrode collector 32. As the positive electrode active material, various materials to be conventionally used as the positive electrode active material of a lithium ion secondary battery can be used with no particular restriction. Some examples thereof may include particles of oxides (lithium transition metal oxides) each including lithium and a transition metal element as a constituent metallic element such as lithium nickel oxide (e.g., $LiNiO_2$), lithium cobalt oxide (e.g., $LiCoO_2$), and lithium manganese oxide (e.g., $LiMn_2O_4$), and composites thereof (e.g., $LiNi_{0.5}Mn_{1.5}O_4$ and $LiNi_{1/3}Co_{1/3}Mn_{1/3}O_2$), and particles of phosphates each including lithium and a transition metal element as a constituent metallic element such as lithium manganese phosphate ($LiMnPO_4$) and lithium iron phosphate ($LiFePO_4$). Such a positive electrode active material layer 34 can be manufactured in the following manner: for example, a positive electrode active material, a conductive material, and a binder (e.g., acrylic resin such as methacrylic acid ester polymer, vinyl halide resin such as polyvinylidene fluoride (PVdF), or polyalkylene oxide such as polyethylene oxide (PEO)) are dispersed in an appropriate disperse medium (e.g., N-methyl-2-pyrrolidone); and the resulting positive electrode slurry is supplied to the surface of the positive electrode collector 32, followed by drying, thereby removing the disperse medium. With the configuration including a conductive material, as the conductive material, a carbon material such as carbon black (typically, acetylene black or ketjen black), active carbon, graphite, or carbon fiber may be used. Among these, either one of these may be used alone, or these may be used in combination of two or more thereof.

The average particle diameter (D50) of the positive electrode active material particles has no particular restriction, and is, in some embodiments 0.5 µm or more, 1 µm or more, for example, 3 µm or more, and in some embodiments 15 µm or less, 10 µm or less, for example, 8 µm or less. The proportion of the positive electrode active material occupying the whole positive electrode active material layer 34 may be about 50 mass % or more, typically, 60 mass % or more, and, for example, 70 mass % or more, and may be typically, 95 mass % or lower, for example, 90 mass % or lower. The proportion of the conductive material in the positive electrode active material layer 34 is, in some embodiments typically 0.1 part by mass or more, 1 part by mass or more, for example, 3 parts by mass or more, and in some embodiments 15 parts by mass or lower, 12 parts by mass or lower, for example, 10 parts by mass or lower for every 100 parts by mass of the positive electrode active material. The proportion of the binder in the positive electrode active material layer 34 can be set at, in some embodiments 0.5 part by mass or more, 1 part by mass or more, for example, 2 parts by mass or more, and in some embodiments 10 parts by mass or lower, 8 parts by mass or lower, and for example, 5 parts by mass or lower for every 100 parts by mass of the positive electrode active material. Further, the thickness (which is the average thickness; the same shall apply hereinafter) after pressing of the positive electrode active material layer 34 can be set at typically 10 µm or more, for example, 15 µm or more, and typically 50 µm or less, for example, 30 µm or less. Further, the density of the positive electrode active material layer 34 has no particular restriction and can be set at typically 1.5 g/cm$^3$ or more, for example, 2 g/cm$^3$ or more, and 3 g/cm$^3$ or lower, for example, 2.5 g/cm$^3$ or lower.

Note that the term "average particle diameter" herein is the cumulative 50% particle diameter ($D_{50}$) in the volume-basis particle size distribution obtained by the laser diffraction scattering method unless otherwise specified. Further, the particle diameter corresponding to the cumulative 10% from the small particle diameter side in the particle size distribution is referred to as $D_{10}$, and the particle diameter corresponding to the cumulative 90% is referred to as $D_{90}$, and the maximum frequent diameter is referred to as $D_{max}$.

Note that, in accordance with the study conducted by the present inventors up to this point, with the configuration in which the positive electrode active material layer 34 includes LPO, for the proportion of LPO, from the viewpoint of combining the improving effect of the overcharge resistance by LPO, and the viscosity rise of the positive electrode paste and the productivity improvement during positive electrode manufacturing, LPO may be set in an amount of 0.88 to 8.8 parts by mass for every 100 parts by mass of the positive electrode active material. In some embodiments, the specific surface area of LPO may be set at 0.9 to 20.3 m$^2$/g from the viewpoint of combining the improvement of the overcharge resistance and the reduction of the reaction resistance. In some embodiments, the average particle diameter of LPO may be 1 µm or more, for example 2 µm or more, and may be 2.5 µm or more, and for example 30 µm or less, 8 µm or less, and may be, for example, 5 µm or less. In some embodiments, the $D_{90}$ of LPO may be 60 µm or less, and may be 40 µm or less, and may be 20 µm or less. In some embodiments, the $D_{10}$ of LPO may be 0.3 µm or more, 0.6 µm or more, and may be 0.8 µm or more. Note that $D_{max}$ may be 80 µm or less, and for example 60 µm or less, and in some embodiments may be 50 µm or less.

Figure 3:
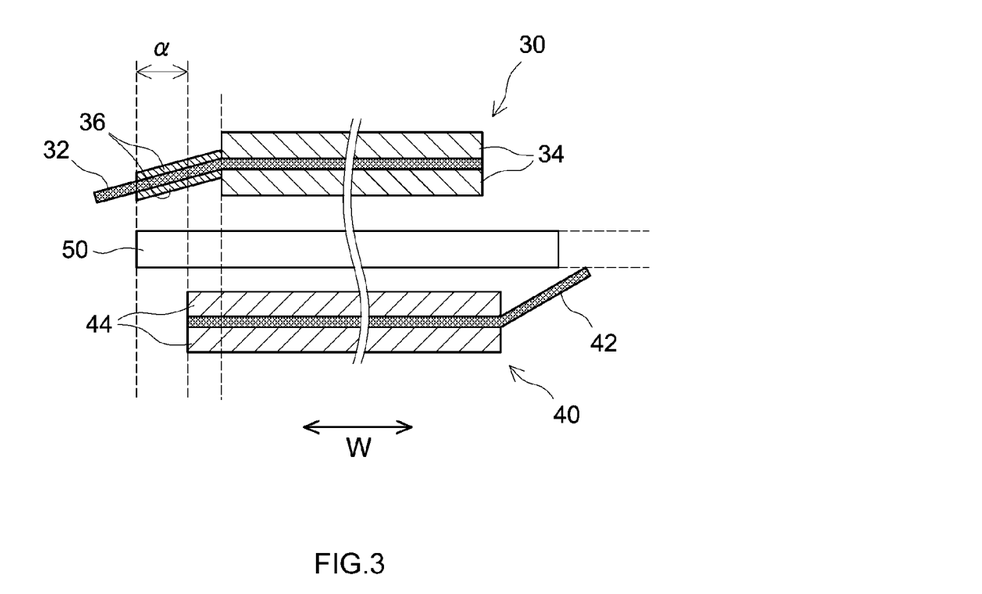
FIG. 3 is an essential part cross sectional view of the wound electrode body of FIG. 2.

The insulation layer 36 is a porous layer having an insulation property and allowing electric charge carriers to be transmitted therethrough. The insulation layer 36 is, as shown in FIGS. 2 and 3, provided at the region which is some part of the surface (one side or both sides) of the positive electrode collector 32, and is adjacent to the positive electrode active material layer 34. Although described later, the insulation layer 36 is provided at the region adjacent to the positive electrode active material layer 34 (the region in which the positive electrode active material layer 34 is not formed), and at least the region opposed to the negative electrode active material layer 44. In FIG. 3, the insulation layer 36 protrudes outwardly from the negative electrode active material layer 44 in the width direction by a dimension a. The dimension a is designed as the dimension enough for allowing the insulation layer 36 to cover the end of the negative electrode active material layer 44 so as to avoid the situation in which the negative electrode active material layer 44 and the positive electrode collector 32 are opposed to each other only via the separator 50 even when the negative electrode active material layer 44 undergoes misalignment. An uncoated part 32A at which the positive electrode collector 32 is exposed for collecting power is provided on the side of the insulation layer 36 not adjacent to the positive electrode active material layer 34. Further, the insulation layer 36 is configured so as to enable the prevention of the short circuit between the positive electrode collector 32 and the negative electrode active material layer 44 even when the separator 50 described later is broken unintentionally. Such an insulation layer 36 is typically formed by binding of an inorganic filler by a binder. The insulation layer 36 herein disclosed is characterized by further including LPO. The insulation layer 36 includes an inorganic filler, and thereby can have the electrochemical stability and the thermal stability. Further, the inclusion of LPO in the insulation layer 36 enables the following: when the battery is rendered in an overcharged state, LPO is dissolved from the insulation layer 36, and effectively forms an inactive good-quality film at the surface contributing to the heat generation of the negative electrode, which can suppress a further exothermic reaction at the negative electrode surface. In other words, for example, the overcharge resistance of the battery can be enhanced.

Figure 4:
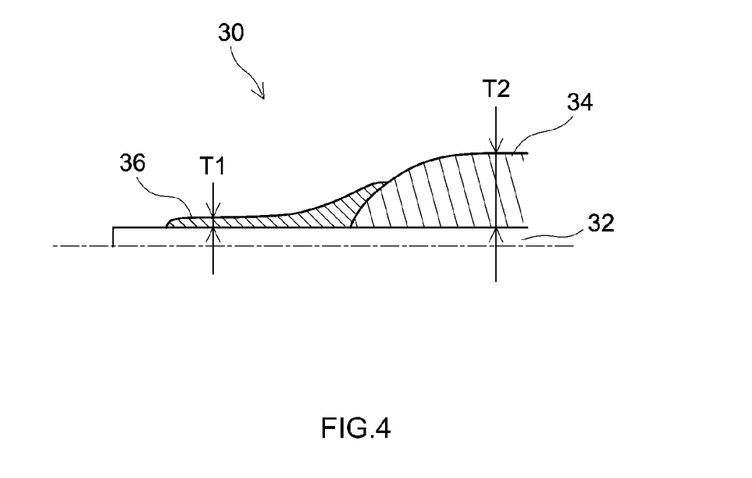
FIG. 4 is an essential part cross sectional view for illustrating a configuration of a positive electrode end in accordance with one embodiment.

The thickness (average thickness; the same shall apply hereinafter.) of the insulation layer 36 is not strictly restricted. For example, when a metal foreign matter is mixed between the positive electrode and the negative electrode, in some embodiments, the thickness may be a thickness enough to sufficiently suppress a short circuit between the positive electrode collector 32 and the negative electrode active material layer 44 due to such a metal foreign matter. From such a viewpoint, the thickness of the insulation layer 36 may be 1 µm or more, 3 µm or more, for example, may be 4 µm or more. However, the insulation layer 36 may inhibit the collecting of foil, and may cause insufficient welding, and hence desirably has the minimum volume. From such a viewpoint, the insulation layer 36 may have a thickness of 10 µm or less, 8 µm or less, for example, may have 6 µm or less. Further, as shown in FIG. 4, for example, the ratio of thicknesses T1 and T2 (T1/T2) is 1 or lower, in some embodiments ½ or lower, ⅖ or lower, ⅓ or lower, and for example ¼ or lower, ⅕ or lower or the like, where T1 represents the thickness of the insulation layer 36, and T2 represents the thickness of the positive electrode active material layer. Further, from the viewpoint that the insulation layer 36 sufficiently exerts its function, the ratio (T1/T2) is desirably 1/10 or more, and may be, for example, 1/8 or more, or 1/6 or more.

As the inorganic filler for forming such an insulation layer 36, there can be used a material having heat resistance and electrochemical stability enough not to be softened or molten at a temperature of 600° C. or more, typically 700° C. or more, for example, 900° C. or more, and enough to be capable of keeping the insulation between the positive and negative electrodes. Typically, the inorganic filler may include an inorganic material having the foregoing heat resistance and insulation property, a glass material, or a composite material thereof. As such inorganic fillers, specifically, mention may be made of inorganic oxides such as alumina ($Al_2O_3$), magnesia (MgO), silica ($SiO_2$), and titania ($TiO_2$), nitrides such as aluminum nitride and silicon nitride, metal hydroxides such as calcium hydroxide, magnesium hydroxide, and aluminum hydroxide, clay minerals such as mica, talk, boehmite, zeolite, apatite, and kaolin, glass materials, and the like. In some embodiments, out of these, boehmite ($Al_2O_3 \cdot H_2O$), alumina ($Al_2O_3$), silica ($SiO_2$), and the like which have stable quality as an inorganic filler, and are low-priced, and readily available may be used. In some embodiments, boehmite can be used because it has the proper hardness. Among these, either one of these may be used alone, or these may be used in combination of two or more thereof. Further, the inorganic filler has no particular restriction on the shape, and may be in various shapes of, for example, particulate, sheet, and fibrous shapes.

The inorganic filler has no particular restriction on the shape. In some embodiments, from the viewpoint of forming the insulation layer 36 having the foregoing thickness, the average particle diameter of the inorganic filler may be 3 μm or less, 2 μm or less, for example, 1 μm or less. However, too fine inorganic filler is inferior in handling property and uniform dispersibility with LPO. Therefore, the average particle diameter of the inorganic filler is typically 0.05 μm or more, 0.1 μm or more, for example, 0.2 μm or more.

Note that inclusion of even a very small amount of LPO in the insulation layer 36 allows the heat generation suppressing effect of the battery and the overcharge resistance improving effect of the battery to be exerted. However, in order for the effects to be exerted more clearly, a larger amount of LPO in the insulation layer 36 is more desirable. In some embodiments, from such a viewpoint, the proportion of LPO in the insulation layer 36 may be 0.1 part by mass or more, 0.5 part by mass or more, and further may be 0.88 part by mass or more for every 100 parts by mass of the inorganic filler. However, the proportion of LPO may be 10 parts by mass or lower, 9 parts by mass or lower, and for example 8.8 parts by mass or lower for every 100 parts by mass of the inorganic filler in view of the insulating manufacturing workability. In some embodiments, the proportion P1 of LPO occupying the insulation layer 36 may be relatively higher than the proportion P2 of LPO included in the positive electrode active material layer 34 and may be the same or higher proportion from the viewpoint of suppressing the heat generation of the battery. Namely, in some embodiments, the ratio (P1/P2) of the proportion P1 of LPO included in the insulation layer 36 to the ratio P2 of LPO included in the positive electrode active material layer 34 may be 0.3 or more, 0.5 or more, may be, for example, 1 or more (or more than 1), and may be 1.2 or more, and in some embodiments 1.5 or more.

LPO has no particular restriction on the shape. For LPO, for example, LPO having the same properties as those of LPO included in the positive electrode active material layer 34 can be used. However, LPO is relatively higher in cost, and in some embodiments, for example, can form the insulation layer 36 having the foregoing thickness, and can be dissolved into the electrolytic solution rapidly when the battery is rendered in an overcharged state. From such a viewpoint, in some embodiments the average particle diameter of LPO may be 10 μm or less, and may be 8 μm or less, for example, 5 μm or less, and may be 1 μm or more, and 2 μm or more, for example, 2.5 μm or more.

In some embodiments, D1, D2<D3 may be satisfied, D1<D2 may be satisfied, and D1<D2<D3 may be satisfied, where D1 represents the average particle diameter of the inorganic filler, D2 represents the average particle diameter of LPO in the insulation layer 36, and D3 represents the average particle diameter of the positive electrode active material. Being D1, D2<D3 can suppress the following: for example, when the insulation layer 36 is formed so as to overlap the end of the positive electrode active material layer 34 as shown in FIG. 4, the surface height position of the insulation layer 36 from the surface of the positive electrode collector 32 becomes higher than the surface height position of the positive electrode active material layer 34 from the surface of the positive electrode collector 32. Further, being D1<D2 enables the following: the strength of the insulation layer 36 is ensured by a fine inorganic filler, and even when LPO is dissolved, the insulation property is ensured, and the short circuit between the positive electrode collector 32 and the negative electrode active material layer 44 may be suppressed. Further, it is possible to achieve the arrangement such that LPO tends to be dissolved into the insulation layer 36.

Further in some embodiments, the specific surface area of LPO in the insulation layer 36 may be 0.1 $m^2/g$ or more, more 0.5 $m^2/g$ or more, further may be 1 $m^2/g$ or more, and in particular may be 2 $m^2/g$ or more, and may be, for example, 3 $m^2/g$ or more. However, the excessive increase in the specific surface area results in inferiority in uniform mixability with the inorganic filler, and productivity of the insulation layer 36. Therefore, in some embodiments, the specific surface area of LPO in the insulation layer 36 may be about 20 $m^2/g$ or lower, and may be 15 $m^2/g$ or lower, and may be, for example, 10 $m^2/g$ or lower. Further in some embodiments, the ratio (S1/S2) may be preferably 0.2 or more, 0.5 or more, in particular may be 0.8 or more, and in particular 1 or more, where S1 represents the specific surface area of LPO in the insulation layer 36, and S2 represents the specific surface area of LPO in the positive electrode active material.

As the binders included in the insulation layer 36, for example, various binders usable for the positive electrode active material layer can be used. Out of these, in some embodiments, as the binder, a vinyl halide resin such as polyvinylidene fluoride (PVdF) may be used from the viewpoint of forming the insulation layer 36 having the foregoing thickness while imparting the flexibility for binding a plurality of positive electrode collectors 32 and collecting power to the insulation layer 36. The proportion of the binder included in the insulation layer 36 is, for example, typically 5 mass % or more, 10 mass % or more, and 15 mass % or more, and may be 20 mass % or more. The binder included in the insulation layer 36 is in an amount of, for example, typically 40 mass % or lower, 35 mass % or lower, and 30 mass % or lower.

The negative electrode 40 is configured such that the negative electrode active material layer 44 is provided on the negative electrode collector 42. For power collection, the negative electrode collector 42 is provided with an uncoated part 42A at which the negative electrode active material layer 44 is not formed, and the negative electrode collector 42 is exposed. The negative electrode active material layer 44 includes a negative electrode active material. Typically, particulate negative electrode active materials may be in the form of being bonded to each other by a binder (binding agent) and being joined to the negative electrode collector 42. The negative electrode active material occludes lithium ions of electric charge carriers from the electrolytic solution, and releases lithium ions to the electrolytic solution in accordance with charging and discharging. As the negative electrode active materials, various materials conventionally for use as the negative electrode active materials of the lithium ion secondary battery can be used with no particular restriction. Some examples thereof may include carbon type materials typified by artificial graphite, natural graphite, and amorphous carbon, and composites thereof (e.g., amorphous carbon coated graphite), and the like, or, materials for forming an alloy with lithium such as silicon (Si), lithium alloys thereof (e.g., $Li_xM$ where M is C, Si, Sn, Sb, Al, Mg, Ti, Bi, Ge, Pb, P, or the like, and X is a natural number.), and a lithium storable compound such as a silicon compound (SiO or the like). The negative electrode 40 can be manufactured in the following manner: for example, a powder-shaped negative electrode active material, a binder (e.g., rubbers such as styrene butadiene copolymer (SBR) and acrylic acid-modified SBR resin (SBR type latex), or cellulose type polymer such as carboxymethyl cellulose (CMC)) are dispersed in an appropriate disperse medium (e.g., water or N-methyl-2-pyrrolidone, water.), resulting in a negative electrode paste; the resulting negative electrode paste is supplied to the surface of the negative electrode collector 42, followed by drying, thereby removing the disperse medium. As the negative electrode collector, an electrically conductive member including a metal with good electric conductivity (e.g., copper, nickel, titanium, or stainless steel) can be used.

The average particle diameter ($D_{50}$) of the negative electrode active material particles has no particular restriction, and is desirably, for example, 0.5 μm or more, 1 μm or more, and in some embodiments 5 μm or more. Further, the average particle diameter ($D_{50}$) may be 30 μm or less, 20 μm or less, and in some embodiments 15 μm or less. The proportion of the negative electrode active material occupying the whole negative electrode active material layer 44 is properly set at about 50 mass % or more and is preferably 90 mass % to 99 mass %, for example, 95 mass % to 99 mass %. When a binder is used, the proportion of the binder occupying the negative electrode active material layer 44 can be set at, for example, about 0.1 part by mass to 5 parts by mass, and, normally, is properly set at about 0.5 part by mass to 2 parts by mass for every 100 parts by mass of the negative electrode active material. The thickness (which is the average thickness; and the same shall apply hereinafter.) of the negative electrode active material layer 44 can be set at, for example, 10 μm or more, typically 20 μm or more, and 80 μm or less, and can be set at, typically, 50 μm or less. Further, the density of the negative electrode active material layer 44 has no particular restriction, and can be set at, for example, 0.8 g/cm$^3$ or more, typically, 1.0 g/cm$^3$ or more and 1.5 g/cm$^3$ or lower, typically, 1.4 g/cm$^3$ or lower, for example, 1.3 g/cm$^3$ or lower.

The separator 50 is a constituent element for insulating the positive electrode 30 and the negative electrode 40 from each other and providing the migration path for electric charge carriers between the positive electrode active material layer 34 and the negative electrode active material layer 44. Such a separator 50 is typically located between the positive electrode active material layer 34 and the negative electrode active material layer 44. The separator 50 may have a nonaqueous electrolytic solution holding function, and a shutdown function of blocking the migration path for electric charge carriers at a prescribed temperature. In some embodiments, such a separator 50 may include a fine porous resin sheet formed of a resin such as polyethylene (PE), polypropylene (PP), polyester, cellulose, or polyamide. Out of these, in some embodiments, a fine porous sheet including a polyolefin resin such as PE or PP may be used because the shutdown temperature may be set within the range of 80° C. to 140° C. (typically, 110° C. to 140° C., for example, 120° C. to 135° C.). The shutdown temperature is the temperature at which the electrochemical reaction of the battery is terminated upon heat generation of the battery. Shutdown is typically exerted by melting or softening of the separator 50 at this temperature. Such a separator 50 may be in a monolayer structure including a single material or may be in a structure in which two or more fine porous resin sheets having different materials and properties (e.g., average thickness and porosity) are stacked (e.g., a three-layered structure in which a PP layer is stacked on each opposite surface of the PE layer).

The thickness (which is the average thickness; the same shall apply hereinafter.) of the separator 50 has no particular restriction and can be set at normally 10 μm or more, typically, 15 μm or more, for example, 17 μm or more. Further, the upper limit can be set at 40 μm or less, typically, 30 μm or less, for example, 25 μm or less. The average thickness of the base material falls within the foregoing range. As a result, the transmissibility of electric charge carriers can be kept good, and a minute short circuit (leakage current) becomes less likely to occur. For this reason, the input output density and the safety can be combined at a high level.

As the nonaqueous electrolytic solution, typically, the one obtained by dissolving or dispersing a support salt (e.g., a lithium salt, a sodium salt, or a magnesium salt, and a lithium salt for a lithium ion secondary battery) as the electrolyte in a nonaqueous solvent can be used with no particular restriction. Alternatively, also acceptable are a so-called polymer electrolyte which has become gel-shaped by adding a polymer to a liquid nonaqueous electrolyte, a solid electrolyte, or the like. As the nonaqueous solvents, various organic solvents such as carbonates, ethers, esters, nitriles, sulfones, and lactones to be used as an electrolytic solution in a general lithium ion secondary battery can be used with no particular restriction. Specific examples thereof may include chain carbonates such as diethyl carbonate (DEC), dimethyl carbonate (DMC), and ethyl methyl carbonate (EMC), and cyclic carbonates such as ethylene carbonate (EC), propylene carbonate (PC). Such a nonaqueous solvent may be fluorinated. Further, the nonaqueous solvents can be used alone, or as a mixed solvent of one or two or more thereof. As the support salts, various ones for use in a general lithium ion secondary battery can be appropriately selected and adopted. For example, there are exemplified use of lithium salts such as $LiPF_6$, $LiBF_4$, $LiClO_4$, $LiAsF_6$, $Li(CF_3SO_2)_2N$, and $LiCF_3SO_3$. The technology herein disclosed provides an effect of suppressing the heat generation during overcharging. Accordingly, in some embodiments, for example, the technology may be used because the effect of the present technology is clearly exerted when a lithium compound including fluorine which generates hydrogen fluoride (HF) upon decomposition during overcharging is used as a support salt. Either one of such support salts may be used alone, or such support salts may be used in combination of two or more thereof. Such support salt may be prepared so that the concentration in the nonaqueous electrolyte falls within the range of 0.7 mol/L to 1.3 mol/L.

Further, the nonaqueous electrolyte may include various additives and the like so long as it does not impair the characteristics of the lithium ion secondary battery of the present disclosure. Such additives can be used as a gas generator, a film forming agent, and the like for one or two or more purposes of the improvement of the input output characteristics, the improvement of the cycle characteristics, the improvement of the initial charging and discharging efficiency of the battery, and the like. As such additives, specifically, mention may be made of fluorophosphate (in some embodiments, difluorophosphate; for example, lithium difluorophosphate expressed as $LiPO_2F_2$), and an oxalato complex compound such as lithium bis(oxalato)borate (Li-BOB). The concentration of the additives based on the total amount of the nonaqueous electrolyte is properly set at generally 0.1 mol/L or lower (typically, 0.005 mol/L to 0.1 mol/L).

Note that, for the lithium ion secondary battery 1 shown in FIG. 1, as the battery case 10, a flat square type battery case is used. However, the battery case 10 may be, a non-flat square type battery case, a cylindrical battery case, a coin type battery case, or the like. Alternatively, the lithium ion secondary battery 1 may be a laminate bag formed in a bag shape obtained by bonding a battery case sheet (typically, aluminum sheet) made of a metal and a resin sheet to each other. Alternatively, for example, the battery case may be formed of aluminum, iron, and an alloy of the metals, high-strength plastic, or the like. Further, the lithium ion secondary battery 1 shown in FIG. 1 includes, for example, a so-called wound type electrode body 20 in the form in which the long positive electrode 30 and negative electrode 40 are stacked one on another while being insulated from each other by two separators 50, and are wound in an elliptic shape in cross section about the wound axis WL as the center. As shown in FIG. 2 and FIG. 3, the relationship of W1<W2<W3 is satisfied, where W1 represents the width of the positive electrode active material layer 34; W2, the width of the negative electrode active material layer 44; and W3, the width of the separator. Still further, the negative electrode active material layer 44 covers the positive electrode active material layer 34 at the opposite ends in the width direction, and the separator 50 covers the negative electrode active material layer 44 at the opposite ends in the width direction. Furthermore, the insulation layer 36 covers at least the positive electrode collector 32 in the region opposed to the end of the negative electrode active material layer 44 while being adjacent to the positive electrode active material layer 34. However, the electrode body 20 of the lithium ion secondary battery 1 herein disclosed is not limited to the wound type electrode body, and may be, for example, the electrode body 20 of a so-called flat plate lamination type (also referred to as a single sheet type) in the form in which a plurality of positive electrodes 30 and negative electrodes 40 are insulated from one another by the separators 50, respectively, and are stacked. Alternatively, also acceptable is a single cell in which one positive electrode 30 and one negative electrode 40 are accommodated in the battery case.

The battery case 10 may be provided with a safety valve for exhausting the gas generated in the inside of the battery case to the outside, a liquid injection port for performing injection of an electrolytic solution, and the like as with the battery case of a conventional lithium ion secondary battery. Further, at the battery case, typically, a positive electrode terminal 38 and a negative electrode terminal 48 for external connection may be disposed while being insulated from the battery case 10. The positive electrode terminal 38 and the negative electrode terminal 48 are electrically connected with the positive electrode 30 and the negative electrode 40 via a positive electrode collector terminal 38a and a negative electrode collector terminal 48a, respectively, thereby allowing an electric power to be supplied to an external load.

The lithium ion secondary battery herein disclosed is usable for various uses, and can also have, for example, higher safety during repeated charging and discharging at a high rate than that of a related-art product. Further, the lithium ion secondary battery herein disclosed can combine the excellent battery performances and reliability (including the safety such as thermal stability during overcharging) at a high level. Therefore, the lithium ion secondary battery herein disclosed may be used for the use requiring high energy density and high input output density, the use requiring high reliability by making using such features. Examples of such uses may include driving power supplies to be mounted in vehicles such as a plug-in hybrid vehicle, a hybrid vehicle, and an electric vehicle. Note that such a secondary battery can be typically used in a form of an assemble battery including a plurality of batteries connected in series and/or in parallel with one another.

As described in the followings, the lithium ion secondary battery herein disclosed was manufactured as a specific example. Note that this is not intended to limit the present disclosure to such a specific example.

Test Example 1

Positive Electrode

First, a lithium nickel cobalt manganese-containing composite oxide ($LiNi_{1/3}Co_{1/3}Mn_{1/3}O_2$: NCM) in a layered structure as a positive electrode active material, trilithium phosphate ($Li_3PO_4$: LPO), polyvinylidene fluoride (PVdF) as a binding agent, acetylene black (AB) as a conductivity aid, and N-methyl-2-pyrrolidone (NMP) as a solvent were mixed, thereby preparing a positive electrode paste. Herein, by making the mass ratio constant at NCM:AB:PVdF=90:8:2, the proportion of LPO per NCM (100 parts by mass) was changed into 0, 0.88, and 8.8 parts by mass as shown in Table 1 below, thereby preparing three positive electrode pastes. Note that, as NCM, the one with an average particle diameter of 4 μm was used, and as LPO, the one with an average particle diameter of 2.9 μm, and a specific surface area of 2.0 m²/g was used.

Boehmite as an inorganic filler (F), trilithium phosphate ($Li_3PO_4$: LPO), PVdF (B) as a binder were dispersed in N-methyl-2-pyrrolidone (NMP) as a disperse medium, and the resulting mixture was kneaded, thereby preparing an inorganic filler paste. Herein, by making the mass ratio constant at F:B=82:18, the proportion of LPO per F (100 parts by mass) was changed within the range of 0 to 8.8 parts by mass as shown in Table 1 below, thereby preparing six positive electrode pastes. Note that, as boehmite, the one with an average particle diameter of 0.9 μm was used, and as LPO, the one with an average particle diameter of 2.9 μm, and a specific surface area of 2.0 m²/g was used.

Then, the prepared positive electrode paste and inorganic filler paste were coated at the same time to long aluminum foil with a thickness of 12 μm by a die coater, and were dried, thereby forming a positive electrode active material layer and an insulation layer. Note that the positive electrode paste was supplied to the region at the center in the width direction of a discharge slit of the die coater, and having a width twice the width of the positive electrode active material layer, and the inorganic filler paste was supplied to the region adjacent to the positive electrode active material layer from both sides of the positive electrode paste in the width direction. As a result, first, a positive electrode with a two-fold width was manufactured. Then, the resulting positive electrode was slit at the center in the width direction of the positive electrode active material layer, thereby obtaining two positive electrodes. Note that the positive electrode paste and the inorganic filler paste for manufacturing one positive electrode were set so that the LPO amounts of respective pastes were the combinations of Examples 1 to 9 shown in Table 1. Table 1 shows the ratios of the contents of LPOs included in the positive electrode active material layer and the insulation layer altogether. Further, the average thickness of the positive electrode active material layer was set within the foregoing range, and the average thickness of insulation layer was set at ⅕ of the positive electrode active material layer (less than 5 µm). The positive electrode manufactured in the present Test Example was provided with the uncoated part, the insulation layer, and the positive electrode active material layer, sequentially, along the width direction of the positive electrode collector. The proportion of the width of the insulation layer to the width of the positive electrode active material layer was set at about 5%, and the proportion of the width of the insulation layer to the width of the uncoated part was set at about 50%.

Negative Electrode

Natural graphite (C) as the negative electrode active material, a styrene butadiene rubber (SBR) as the binder, and carboxymethyl cellulose (CMC) as a thickener were kneaded with ion exchanged water at a mass ratio of C:SBR:CMC=98:1:1, thereby preparing a negative electrode paste. The paste was coated to both surfaces of long copper foil with a thickness of 10 µm, and was dried, thereby obtaining a negative electrode having a negative electrode active material layer with a width of about 100 mm, and an average thickness of about 30 µm. The copper foil was provided with an uncoated part at which the negative electrode active material layer was not formed along the end in the width direction for power collection.

Construction of Lithium Ion Battery

Each positive electrode and each negative electrode of Examples 1 to 9 prepared in the foregoing description were stacked one on another via two separators so as to be insulated from each other, and wound, thereby constructing a wound electrode body. At this step, the positive electrode and the negative electrode were stacked one on another so that the uncoated part of the positive electrode and the uncoated part of the negative electrode were situated opposite to each other in the width direction, and the negative electrode active material layer extends off at both ends in the width direction of the positive electrode active material layer, and the insulation layer extends off the end of the negative electrode active material layer opposed in the width direction. As the separator, a microporous sheet in a three-layered structure of PP/PE/PP was used. The positive electrode uncoated part and the negative electrode uncoated part of each prepared wound electrode body were connected with the positive electrode terminal and the negative electrode terminal of the battery case, respectively, and were accommodated in the case main body together with a nonaqueous electrolytic solution, followed by closing, thereby obtaining each lithium ion battery for evaluation of Examples 1 to 9. As the nonaqueous electrolytic solution, there was used the one obtained by dissolving $LiPF_6$ as a support salt in a mixed solvent including ethylene carbonate (EC), ethyl methyl carbonate (EMC), and dimethyl carbonate (DMC) at a volume ratio of EC:EMC:DMC=3:3:4 in a concentration of 1 mol/L.

Measurement of Temperature Increase Rate Due to Overcharging

Using each of the prepared lithium ion batteries for evaluation 1 to 9, the battery temperature when an overcharging state was achieved under the following conditions was measured, thereby calculating the temperature increase rate. Namely, a thermocouple was attached to the outer surface of the battery case of the lithium ion battery of each Example, for stabilization at a 25° C. thermostat. Then, the maximum attained temperature of the battery when constant current charging was performed until the battery voltage became 5.1 V (overcharged state) under 25° C. temperature environment was recorded, thereby calculating the margin of increase in temperature from 25° C. Then, with reference to the margin of increase in temperature (° C.) of the lithium ion battery of Example 6 (100%), the rising temperature of the battery of each Example was normalized. The results are shown as "temperature increase rate during overcharging" in Table 1.

TABLE 1

| Example | Positive electrode LPO [parts by mass] | Insulation layer LPO [parts by mass] | Ratio [—] | Temperature increase rate during overcharging (%) |
|---|---|---|---|---|
| 1 | 0 | 0 | — | 185 |
| 2 | 0.88 | 0 | 0.00 | 168 |
| 3 | 0 | 0.88 | — | 110 |
| 4 | 0.88 | 0.30 | 0.34 | 150 |
| 5 | 0.88 | 0.50 | 0.57 | 130 |
| 6 | 0.88 | 0.88 | 1.00 | 100 |
| 7 | 0.88 | 1 | 1.14 | 80 |
| 8 | 0.88 | 2 | 2.27 | 77 |
| 9 | 8.8 | 8.8 | 1.00 | 100 |

As shown in Table 1, for the battery of Example 1 in which either of the positive electrode active material layer and the insulation layer did not include LPO, the temperature increase rate was the highest as high as 185%, and the temperature increase rate during overcharging was high. Further, for the battery of Example 2 in which only the positive electrode active material layer included LPO, as compared with Example 1, although the temperature increase rate reduced, the temperature increase rate during overcharging was still relatively higher as high as 168%. In contrast, it was confirmed as follows: for the battery of Example 3 in which the positive electrode active material layer did not include LPO, and only the insulation layer included LPO, the temperature increase rate largely reduced to 110% as compared with Examples 1 and 2, and the safety during overcharging was largely improved than with the batteries of Examples 1 and 2. Namely, it was revealed as follows: the inclusion of LPO in the insulation layer with a smaller volume in the same concentration provides a higher effect of suppressing the increase in battery temperature during overcharging than the inclusion of LPO in the whole positive electrode active material layer with a larger volume.

However, comparison between Example 3 and Example 6 indicated that the inclusion of LPO in both of the insulation layer and the positive electrode active material layer can more enhance the effect of suppressing the increase in battery temperature during overcharging than the inclusion of LPO in only the insulation layer. Comparison between Example 2 and Examples 4 to 8 indicates that the effect of suppressing the increase in battery temperature during overcharging increases with an increase in amount of LPO in the insulation layer. These revealed that the inclusion of even a small amount of LPO in the insulation layer allows the effect of suppressing the increase in battery temperature to be exerted, and that the effect is enhanced with an increase in concentration of LPO in the insulation layer.

Note that, although not specifically shown, the resistance increase rates during high-rate output (25° C., SOC 56%, 10 C) of the batteries of Examples 6 to 8 were measured. As a result, as compared with the battery of Example 6, each battery of Examples 7 and 8 had a lower resistance increase rate. For example, when the resistance increase rate of the battery of Example 6 was assumed to be 100, the resistance increase rate of each battery of Examples 7 and 8 was found to be 97 to 99. This indicates that the amount of LPO in the insulation layer is preferably larger than the amount of LPO in the positive electrode active material layer. In other words, the ratio of the amount of LPO in the insulation layer to the amount of LPO in the positive electrode active material layer is desirably 1 or more (preferably more than 1).

Test Example 2

In the same manner as with Example 6 of the Test Example 1, there was manufactured a lithium ion battery for evaluation including a positive electrode in which LPO was included in both of the positive electrode active material layer and the insulation layer in a content of 0.88 part by mass. However, the specific surface areas of LPOs for use in the positive electrode active material layer and the insulation layer, and the combinations thereof were set as the combinations of Examples 1 to 9 shown in Table 2 below, resulting in lithium ion batteries for evaluation of Examples 1 to 9. Then, for the lithium ion battery of each Example, the temperature increase rate due to the same overcharging as that in Test Example 1 was measured. The results are shown in Table 2 below. Note that, the temperature increase rate shows the result obtained by normalizing the rising temperature of the battery of each Example with the temperature rise of the lithium ion battery of Example 4 as a reference (100%). For reference, the specific surface area of LPO was adjusted by the particle size of LPO.

TABLE 2

| | LPO specific surface area | | | |
| --- | --- | --- | --- | --- |
| Example | Positive electrode active material layer [m$^2$/g] | Insulation layer [m$^2$/g] | Specific surface area ratio [—] | Temperature increase rate during overcharging(%) |
| 1 | 2.0 | 0 | 0 | 155 |
| 2 | 2.0 | 0.5 | 0.25 | 135 |
| 3 | 2.0 | 1.5 | 0.75 | 128 |
| 4 | 2.0 | 2.0 | 1 | 100 |
| 5 | 2.0 | 2.2 | 1.1 | 77 |
| 6 | 2.0 | 2.5 | 1.25 | 80 |
| 7 | 2.0 | 3.0 | 1.5 | 75 |
| 8 | 2.0 | 10.0 | 5 | 85 |
| 9 | 20.3 | 20.3 | 1 | 100 |

As shown in Table 2, it was revealed as follows: even when the amounts of LPOs included in the insulation layers are the same, the effect of suppressing the increase in battery temperature during overcharging tends to be enhanced relatively with an increase in specific surface area of LPO. This is considered due to the following: an increase in specific surface area causes LPO to be dissolved more rapidly at the initial stage at which a high electric potential state was reached by overcharging, forming an inactive film at the negative electrode. However, as indicated by comparison between Example 4 and Example 9, it can be said that when the specific surface area of LPO included in the positive electrode active material layer is as large as that of LPO included in the insulation layer even though the specific surface area of LPO is large, the effect of suppressing the temperature increase rate is not exhibited so remarkably. Although not particularly revealed, conceivably, the specific surface area of LPO included in the insulation layer is larger than that of LPO included in the positive electrode active material layer. Accordingly, the concentration gradient of phosphoric acid ions is preferably formed in the electrolytic solution. This and other factors result in the formation of a film preferable for suppressing the temperature rise on the negative electrode surface. Further, when the specific surface area of LPO is too large, LPO aggregates. This may conceivably rather inhibit the dissolution of LPO. Therefore, it can be said that the ratio of the specific surface area of LPO in the insulation layer to the specific surface area of LPO in the positive electrode active material layer is desirably 1 or more.

Up to this point, the specific examples of the present disclosure were described in detail. However, these are merely examples, and are not intended to limit the appended claims. The technology described in the appended claims includes various modifications and changes of the specific examples exemplified in the description up to this point.

What is claimed is:
1. A lithium ion secondary battery comprising:
   a positive electrode, the positive electrode comprising:
      a positive electrode collector;
      a positive electrode active material layer provided on a first region of a surface of the positive electrode collector including a positive electrode active material; and
      an insulation layer provided on a second region of the surface of the positive electrode collector, and adjacent to the positive electrode active material layer; and
   a negative electrode;
   and
   wherein the insulation layer includes an inorganic filler, trilithium phosphate, and a binder, and the proportion of the trilithium phosphate in the insulation layer is from 0.1 to 10 parts by mass with respect to 100 parts by mass of the inorganic filler.
2. The lithium ion secondary battery according to claim 1, wherein the positive electrode active material layer includes trilithium phosphate, and
   P1/P2≥1 is satisfied, where P1 represents the proportion of the trilithium phosphate occupying the insulation layer, and P2 represents the proportion of the trilithium phosphate occupying the positive electrode active material layer.
3. The lithium ion secondary battery according to claim 2, wherein S1/S2 is 1 or more, where S1 represents the specific surface area of the trilithium phosphate included in the insulation layer, and S2 represents the proportion of the trilithium phosphate included in the positive electrode active material layer.

4. The lithium ion secondary battery according to claim 1, wherein D1<D2<D3 is satisfied, where D1 represents the average particle diameter of the inorganic filler included in the insulation layer, D2 represents the average particle diameter of the trilithium phosphate included in the insulation layer, and D3 represents the average particle diameter of the positive electrode active material included in the positive electrode active material layer.

5. The lithium ion secondary battery according to claim 1, wherein $T1/T2 \leq 1$ is satisfied, where T1 represents the average thickness of the insulation layer, and T2 represents the average thickness of the positive electrode active material layer.

* * * * *